(12) United States Patent
Sugiyama

(10) Patent No.: US 8,153,175 B2
(45) Date of Patent: Apr. 10, 2012

(54) METHOD OF PRODUCING GABA-CONTAINING FERMENTED PRODUCT

(75) Inventor: Masanori Sugiyama, Hiroshima (JP)

(73) Assignee: Hiroshima University, Hiroshima-shi (JP)

( * ) Notice: Subject to any disclaimer, the term of this patent is extended or adjusted under 35 U.S.C. 154(b) by 1009 days.

(21) Appl. No.: 12/092,761

(22) PCT Filed: Nov. 7, 2006

(86) PCT No.: PCT/JP2006/322184
§ 371 (c)(1),
(2), (4) Date: May 6, 2008

(87) PCT Pub. No.: WO2007/052806
PCT Pub. Date: May 10, 2007

(65) Prior Publication Data
US 2010/0285177 A1    Nov. 11, 2010

(30) Foreign Application Priority Data

Nov. 7, 2005   (JP) ................... 2005-321887

(51) Int. Cl.
*A23L 1/28*   (2006.01)
*A23L 2/00*   (2006.01)
*A23F 3/16*   (2006.01)
*A23K 1/00*   (2006.01)
*C12N 1/00*   (2006.01)

(52) U.S. Cl. ............ 426/51; 426/52; 426/61; 426/63; 426/599; 426/615; 435/235

(58) Field of Classification Search ............. 426/51, 426/52, 61, 63, 599, 615; 435/235
See application file for complete search history.

(56) References Cited

U.S. PATENT DOCUMENTS

2005/0202122 A1 * 9/2005 Ichijo et al. ............ 426/52

FOREIGN PATENT DOCUMENTS

| JP | 5 64541 | 3/1993 |
|---|---|---|
| JP | 05-184291 | 7/1993 |
| JP | 05-015366 | 1/1996 |
| JP | 2000-308457 | 11/2000 |
| JP | 2000-308475 | 11/2000 |
| JP | 2001 231442 | 8/2001 |
| JP | 2004 187501 | 7/2004 |
| JP | 2004 313032 | 11/2004 |
| JP | 2004-313032 | * 11/2004 |
| JP | 2005-013127 | 1/2005 |
| JP | 2006 42796 | 2/2006 |
| JP | 2006-042796 | * 2/2006 |

OTHER PUBLICATIONS

Takahashi T. et al., "Isolation and characterization of sake yeast mutants deficient in gamma-aminobutyric acid utilization in sake brewing.", XP002552746, 2004, abstract, 1 page.
Sugiyama, Masanori "Komen eki Kinosei Food Material no Tansaku . Kiban Kenkyu to shin Gijutsu Kaihatsu", High-Tech Information, No. 163, pp. 8-11, (2005), (with partial English translation).
Nakazawa, Takeshi "Daizu ni Okeru Y-Amino Rakusan (GABA) no Hakko Seisan", Japan Society for Bioscience, Biotechnology, and Agrochemistry, 3A16p10, p. 208, (2003), (with English translation).
Japanese Office Action in Japanese Patent Application No. 2007-542847, dated Nov. 1, 2011 (w/English Translation).

* cited by examiner

*Primary Examiner* — Ganapathirama Raghu
(74) *Attorney, Agent, or Firm* — Oblon, Spivak, McClelland, Maier & Neustadt, L.L.P.

(57) ABSTRACT

It is intended to provide a method of efficiently producing a fermented fruit or vegetable product which contains GABA at an elevated concentration without damaging the inherent flavor of the fruit or the vegetable. A method of producing a fermented product containing γ-aminobutyric acid which is characterized by comprising fermenting a plant or its press juice by using *Enterococcus avium* in the presence of glutamic acid or its salt and sake cake or its extract.

10 Claims, No Drawings

SEQUENCE LISTING

```
<160> NUMBER OF SEQ ID NOS: 4

<210> SEQ ID NO 1
<211> LENGTH: 242
<212> TYPE: DNA
<213> ORGANISM: Enterococcus avium

<400> SEQUENCE: 1
ggacgctatt caccgcggcg tgctgatccg cgattactag cgattccggc ttcatgtagg      60
cgagttgcag cctacaatcc gaactgagag aagctttaag agattagctt agcctcgcga     120
cttcgcgact cgttgtactc cccattgtag cacgtgtgta gcccaggtca taagggcat      180 gatgatttga cgtcatcccc accttcctcc ggtttgtcac cggcggtctc gctagagtgc     240
cc                                                                    242

<210> SEQ ID NO 2
<211> LENGTH: 20
<212> TYPE: DNA
<213> ORGANISM: Artificial Sequence
<220> FEATURE:
<223> OTHER INFORMATION: Description of Artificial Sequence: Synthetic
      primer 27f

<400> SEQUENCE: 2
agagtttgat cctggctcag                                                  20

<210> SEQ ID NO 3
<211> LENGTH: 18
<212> TYPE: DNA
<213> ORGANISM: Artificial Sequence
<220> FEATURE:
<223> OTHER INFORMATION: Description of Artificial Sequence: Synthetic
      primer 1525r
```

```
<400> SEQUENCE: 3
aaaggaggtg atccagcc                                                   18

<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      primer r2L

<400> SEQUENCE: 4
gactaccagg gtatctaatc                                                 20
```

METHOD OF PRODUCING GABA-CONTAINING FERMENTED PRODUCT

CROSS-REFERENCE TO RELATED APPLICATIONS

The present application is a 35 U.S.C. §371 National Stage patent application of International patent application PCT/JP2006/322184, filed on Nov. 7, 2006, which claims priority to Japanese patent application JP 2005-321887, filed on Nov. 7, 2005.

TECHNICAL FIELD

The present invention relates to a method of producing a fermented product containing γ-aminobutyric acid (hereinafter also referred to as "GABA") by using *Enterococcus avium*.

BACKGROUND ART

GABA is one of the amino acids widely present in the nature and contained in sprouted brown rice, tea, vegetables and grains. GABA is an inhibitory neurotransmitter present in the brain and the spine of mammalians including humans and known to have physiological effects such as antihypertensive effect, mood-stabilizing effect, anti-stress effect, alcohol metabolism acceleration effect, brain metabolism acceleration effect and anti-obesity effect.

Accordingly, in expectation of improving hypertension and obtaining a tranquilizing effect, it has been proposed to take food enriched in GABA. To increase the content of GABA in food, the following methods have been developed: for example, a method of increasing the content of GABA by processing tea leaves in anaerobic conditions such as commercially available Gabaron tea and a method of markedly increasing the content of GABA and free amino acids by soaking, for example, rice germ in water (Non-Patent Document 1). However, these methods have problems in that GABA is diluted when extraction of tea leaves is performed with hot water and that a large amount of germ must be collected. These problems still remain unsolved.

On the other hand, foods enriched in GABA have been developed by microbiological fermentation methods as shown in the following reports:

a method of obtaining GABA in a high concentration by inoculating two types of lactobacilli (Patent Document 1);

a method of obtaining GABA by lactic fermentation of glutamic acid (a starting material for GABA), which is produced by processing a milk product with a protease (Patent Document 2);

a method using a *lactobacillus* isolated from Korean pickle, kimchi (Patent Document 3);

a method using a *lactobacillus* isolated from crucian sushi (Patent Document 4);

a method of attaining a low sodium content by use of glutamic acid and two or more types of lactobacilli (Patent Document 5); and a method of producing soybeans added with GABA by use of a *lactobacillus* having glutamic decarboxylase (Patent Document 6).

[Patent Document 1] JP-A-2000-308457
[Patent Document 2] JP-A-2001-120179
[Patent Document 3] JP-A-2003-70462
[Patent Document 4] JP-A-2005-102559
[Patent Document 5] JP-A-2005-198578
[Patent Document 6] JP-A-2004-187501
[Non-Patent Document 1] Chemistry and Biology Vol 33, No. 4, 1995

DISCLOSURE OF THE INVENTION

Problem to be Solved by the Invention

The present invention relates to providing a method of efficiently producing a fermented product of a fruit or vegetable, containing GABA in a higher concentration without damaging taste and flavor of the fruit and vegetable.

Means for Solving the Problem

In consideration of the circumstances, the present inventors have studied on microorganisms capable of efficiently producing GABA and suitable for plant fermentation and fermentation conditions. As a result, they found that, when a plant or plant's juice is fermented with *Enterococcus avium* in the presence of glutamic acid or a salt thereof and sake cake, a fermented product containing GABA in a high concentration can be obtained.

More specifically, the present invention is concerned with a method of producing a fermented product containing γ-aminobutyric acid, characterized by fermenting a plant or juice thereof with *Enterococcus avium* in the presence of glutamic acid or a salt thereof and sake cake or an extract thereof.

The present invention is further concerned with a fermented product produced by the aforementioned method.

The present invention is further concerned with food or feed containing a fermented product produced by the aforementioned method.

Effects of the Invention

According to the present invention, it is possible to produce a fermented product of a plant and juice thereof containing GABA in a high concentration without damaging the taste and flavor of a plant such as a fruit or vegetable. In addition, it is possible to produce food or feed having a function such as an antihypertensive effect and a tranquilizing effect, by use of the fermented product.

BEST MODE FOR CARRYING OUT THE INVENTION

A method of producing a fermented product containing GABA according to the present invention includes fermenting a plant or juice thereof with *Enterococcus avium* in the presence of glutamic acid or a salt thereof and sake cake or its extract.

Examples of raw materials for use in the method of the present invention include, as a plant, fruits such as oranges, peaches, grapes, strawberries and pears and vegetables such as carrots and tomatoes or juice thereof. Of them, oranges, peaches, grapes, strawberries, pears and carrots are preferred in view of the yield of GABA.

The kinds of oranges, peaches, grapes, strawberries pears and carrots are not particularly limited. However, as oranges, Citrus unshiu Markovich may be mentioned. As peaches, white peach, yellow peach, Okubo and Hakuho may be mentioned. As grapes, Campbell Early, Super Hamburg, Kyoho, Pione, Muscat of Alexandria, neo-Muscat, Muscat berry A, Delaware, Koshu and Semillon may be mentioned. As strawberries, Sachinoka, Toyonoka, Aiberry and Nyoho may be mentioned. As pears, Housui pear and Nijuseiki may be mentioned. As carrots, *Daucus Carota* L. var *satiraDC*, Kintoki carrot, Mini carrot and Gosun carrot may be mentioned.

The juice thereof refers to fruit juice or vegetable juice, which is obtained by crushing a plant as mentioned above into pieces by a mixer or the like and further optionally squeezing the pieces. The juice thus obtained may be appropriately concentrated. The concentrated juice may be directly used or diluted with distilled water to an appropriate concentration and then put in use as a material to be subjected to fermentation of the present invention.

The plant or juice thereof may be used as a raw material for a fermentation product according to the present invention, singly or in combination depending upon the purpose.

Note that, to each of the plant or juice thereof, materials usually used in producing fermented milk, such as gelatin, agar, saccharides, spices and fruit pulp may be added. Examples of these materials include saccharides such as sucrose, glucose, fructose, palatinose and trehalose; sugar alcohols such as sorbitol, xylitol, erythritol, reduced starch syrup; sweeteners having a high degree of sweetness such as aspartame and acesulfame potassium; emulsifying agents such as sucrose fatty acid ester, glycerin fatty acid ester and lecithin; thickeners such as carageenan, xanthan gum and Guar gum, acidulants such as citric acid, lactic acid and malic acid; fruit juices such as lemon juice and orange juice. Other than these, mention may be made of vitamins, minerals such as calcium, iron, manganese and zinc, herb medicines such as licorice root, cinnamon and ginger and herb.

The glutamic acid (sometimes referred to as "Glu") to be used in fermentation according to the present invention chemically refers to L-glutamic acid, which is one of the amino acids. As a salt of glutamic acid, a sodium salt may be mentioned. As the glutamic acid or a salt thereof, use may be made of glutamic acid or sodium glutamate, serving as a food additive used as a seasoning or glutamic acid obtained by hydrolysis of food protein with an acid or an enzyme.

Alternatively, a seasoning containing free glutamic acid or the like, a processed marine product or a food material such as tomato may be used as a supply source for glutamic acid or a salt thereof.

The use amount of glutamic acid or a salt thereof is not particularly limited; however, preferably 30 wt % or less, more preferably, 0.1 to 10 wt %, and particularly preferably, 1 wt % to 5 wt %. Total amount of Glutamic acid or a salt thereof may be added at once or divided into several portions.

In the present invention, the term "sake cake" refers to "sake lees" or "distillation residue of Japanese spirits". The "sake lees" refer to the residue of sake mash left after refined sake is squeezed from the "sake mash". The "distillation residue of Japanese spirits" is the residue left when Japanese spirits are produced by distilling a fermentation product (alcohol) of grains and the like. The sake cake can be used as it is. Alternatively, an extract from the sake cake may be used.

When fermentation is performed in the presence of sake cake, the yield of GABA can be increased.

When sake cake, which contains a large amount of water, is used as it is, well-dried sake cake is preferably used in order to prevent decomposition thereof. The dehydration means is not particularly limited. Use may be made of known dehydration methods such as freeze drying method, hot-air drying method, microwave drying method, spray-drying method and far-infrared rays irradiation drying method. Note that, in this specification, the dried sake cake obtained by the spray-drying method will be sometimes referred to as "SD".

The sake cake extract can be obtained by performing extraction with an appropriate solvent at normal temperature or under heating. The extract of the present invention includes extract solutions with various types of solvents, diluted solutions thereof, concentrated solutions or dried powders thereof.

As the extraction solvent for use in obtaining the aforementioned extract, either a polar solvent or a nonpolar solvent may be used. These solvents may be used in a mixture. Examples of solvents may include water; alcohols such as methanol, ethanol, propanol and butanol; polyols such as propylene glycol and butylene glycol; esters such as ethyl acetate; hydrocarbons such as n-hexane; and halogenated hydrocarbons such as chloroform. Of them, water, an alcohol, and a water-alcohol mixture are preferable. In particular, water, ethanol, an aqueous ethanol solution is preferable. Of them, an ethanol 15 to 75% (vol/vol) in aqueous solution is preferable.

The extraction conditions vary depending upon the solvent to be used. When extraction is performed with water, an alcohol, a water-alcohol mixture, or ethyl acetate, extraction is preferably performed by using 1 to 10 parts by weight of a solvent relative to one part by weight of sake cake or distillation residue of Japanese spirits at a temperature of 4 to 40° C., and preferably, 20 to 30° C. for 1 to 5 days and, in particular, one day.

The extract mentioned above may be used as it is. Alternatively, the extract may be diluted, concentrated or subjected to freeze dry and thereafter, optionally pulverized into powder or prepared in paste form and then put in use. Otherwise, the extract, from which inactive contaminants are removed, may be used. Furthermore, if necessary, the extract may be subjected to a known deodorization process or decoloration process and then put in use.

The addition amount of sake cake and extract thereof is preferably 0.01 wt % to 5.0 wt % relative to the fermentation raw material, further preferably, 0.05 wt % to 3.0 wt %, and particularly preferably, 1.0 wt % to 2.0 wt %.

Glutamic acid or a salt thereof and sake cake or its extract may be previously blended to a plant or juice thereof or added thereto during fermentation. Note that yeast extract may be added in order to increase the yield of GABA to the extent that the extract may not damage its taste and flavor.

*Enterococcus avium* to be used in the production method of the present invention is a facultative anaerobic gram positive micrococcus and resident flora present in the intestinal tract and oral cavity of a human. *Enterococcus avium* G15 (hereinafter also referred to as "G15 strain") shown below is preferably used.

*Enterococcus avium* G 15 is a strain, which was for the first time isolated by the present inventor from carrot's leaves grown in accordance with pesticide-free farming and deposited (NITE BP-142) on Sep. 22, 2005 at the Patent Microorganisms Depositary (NPMD) of the Incorporated Administrative Agency National Institute of Technology and Evaluation located at 2-5-8 Kazusakamatari, Kisarazu-shi, Chiba, 292-0818, JAPAN. *Enterococcus avium* G 15 has the following bacteriological properties:

1) *Streptococcus,* 2) Gram staining: positive, 3) having Lancefield's group D antigen, 4) catalase activity: negative, 5) spore formation ability: none, 6) facultative anaerobe.

As shown in Example 2 later, when G15 stain was cultured in MRS liquid medium at 30° C. for 48 hours, GABA was confirmed to be produced in an amount of 270 mg/100 ml. From this, it is determined that G15 strain of the present invention is a *lactobacillus* producing GABA from glutamic acid with the action of glutamic acid decarboxylase.

Since G15 strain is inactivated as acidity is reduced with the progress of lactic acid fermentation, and dies at a low acidity of pH 4.7, G15 strain is useful for producing food slightly acidulated.

The number of *Enterococcus avium* cells for use in fermentation is not particularly limited. However, when the number of bacterial cells is low, a long time is required for bacterial growth, with the result that contamination with saprophytic bacteria likely occurs. In contrast, when the number of bacterial cells is large, a long time is required for preculturing, inevitably increasing the cost. For this reason, an *Enterococcus avium* culture solution previously prepared is preferably added as a starter in an amount of 0.5% to 5%, more preferably, 1% to 3%, and particularly preferably, 1.5% to 2.5%.

Fermentation may be performed by a batch method, which is performed under aeration, stirring, standstill conditions or a combination thereof, or by a continuous method using, for example, a column loaded with *lactobacillus* cells, to which immobilization treatment has been applied.

Working temperature is preferably 20 to 45° C., more preferably 25 to 40° C., and particularly preferably, 28 to 37° C. in view of the yield of GABA.

Cultivation time may be appropriately selected within the range of 1 hour to 10 days.

Furthermore, during the reaction, pH varies. The pH change may be adjusted with an organic acid such as sodium citrate or an alkali such as caustic soda. The measurement and adjustment of pH may be performed in accordance with customary methods.

When sodium citrate is used as a pH adjuster, it is preferably added in an amount of 0.1 wt % to 20 wt %, further preferably, 0.5 wt % to 10 wt %, and particularly preferably, 1 wt % to 5 wt %.

The fermented product thus obtained may be used as it is. However, the fermented product may be used after increased in GABA content by subjecting it to general processing steps such as column separation, filtration, concentration and dehydration.

The fermented product of the present invention, although the content of GABA thereof has been increased, maintains the taste and flavor of a raw material thereof, as shown in Example 1 later. The fermented product alone or the fermented product in combination with various types of foods or feed materials can serve as functional foods and feed materials having an antihypertensive effect, tranquilizing effect, anti-stress effect, alcohol metabolism acceleration effect, brain metabolism acceleration effect and anti-obesity effect. More specifically, functional food and drink, which proclaims the aforementioned functions, food and drink for patients, food for specified health use and nutritional supplements can be prepared.

The form of food according to the present invention is not particularly limited; however, use may be made of drinks such as fruit juices, carbonated drinks, tea-based drinks, milk drinks, alcohol drinks and cold drinks; and all forms of foods such as gelatinous foods and various types of snacks, baked confectioneries, cakes, chocolates, jams, breads, gums, candies, soups, pickles and fish boiled in soy sauce. Furthermore, use may be made of feed materials such as pet feed, cattle feed and production diet.

Preparation examples of yogurt and pickle containing a fermented product obtained by the method of the present invention will be described below.

<Yogurt>

The fermented product of the present invention is added to part of the raw material for yogurt so as to obtain a concentration of 0.1 wt % to 20 wt %, preferably 0.5 wt % to 10 wt %, further preferably, 1 wt % to 5 wt % and stirred. An aqueous solution of the resultant raw material is prepared such that the solid content of nonfat milk is 8.0% or more, subjected to heat sterilization at a temperature of 65 to 130° C. for one second to 30 minutes, and then, cooled to a temperature of 25 to 45° C. Subsequently, *lactobacillus* cells are inoculated as a starter to the aqueous solution in an amount of 0.1 to 6 wt %. After the inoculation, fermentation is performed at a temperature of 25 to 45° C. for 3 to 72 hours until the amount of *lactobacillus* cells reaches 10,000,000 cells/ml or more. After completion of fermentation, the fermentation solution is cooled to 10° C. or less to obtain yogurt containing GABA.

<Pickle>

A vegetable such as Japanese radish, cucumber, Chinese cabbage, cabbage, carrot or eggplant preserved in salt is prepared in accordance with conventional production method for a pickle. If necessary, *lactobacillus* cells, sugar and yeast extract are added to accelerate fermentation. In addition, pH, taste and flavor thereof and so forth, are adjusted. To the pickle (pickle intermediate) thus prepared (pH 3.8 to 5.0), a fermented product according to the present invention is added so as to obtain a concentration of 0.5 wt % to 100 wt %, preferably 2 wt % to 50 wt %, further preferably, 3 wt % to 20 wt %, and further optionally seasonings are added. The pickle intermediate is allowed to mature to obtain a pickle containing GABA.

EXAMPLES

The present invention will be described more specifically by way of Examples; however, the present invention will not be limited to these Examples.

Example 1

Isolation and Identification of *Enterococcus avium* G15

Carrot leaves were cut into pieces. The leaf pieces (0.5 g) were added to 10 mL of MRS liquid medium (placed in a 15 mL-test tube with a screw-plug) containing 0.5% sodium glutamate, tapped with the screw plug and cultured at 30° C. and 37° C. in slightly anaerobic conditions.

On the 3rd and 7th day, 100 μL was removed from each of the culture mediums and inoculated in MRS liquid medium containing 0.5% sodium glutamate. This was cultured for 3 days. 100 μL was again removed from the medium and inoculated in MRS liquid medium containing 0.5% sodium glutamate. This was cultured for 3 days. A 100-fold dilution solution (100 μL) of the resultant culture product was smeared onto MRS agar medium containing 1% calcium carbonate and 0.5% sodium glutamate and cultured at respective temperatures in anaerobic conditions using AnaeroPack Kenki.

A singly colony with a transparent periphery was picked up and suspended in MRS liquid medium. Thereafter, the suspension solution was again smeared onto MRS agar medium containing 1% calcium carbonate and 0.5% sodium glutamate. This procedure was repeated again. Cultivation was finally performed in MRS liquid medium containing 0.5% sodium glutamate. To this, the same amount of MRS liquid medium containing 20% glycerol was added to prepare a glycerol stock and stored at −70° C.

From plates cultured at 30° C. and 37° C., 15 colonies in total were picked up. Of them, 8 colonies (6 colonies from 30° C. cultivation and 2 colonies from 37° C. cultivation) were bacterial cells producing a large amount of GABA. As a result of gram staining, all of the 8 colonies were found to be gram positive streptococcus.

One of these strains was amplified by PCR using 16S r-RNA primers: (27f) 5'-agagtttgatcctggctcag-3' (SEQ ID NO: 2) and (1525r) 5'-aaaggaggtgatccagcc-3' (SEQ ID NO: 3) to obtain a fragment of about 1.5 kb. Subsequently, direct sequence was performed using a primer: (r2L) 5'-gactac-cagggtatctaatc-3' (SEQ ID NO: 4). Research was performed in accordance with program FASTA provided by the home page of DDBJ (DNA Data Bank of Japan). As a result, it was confirmed that the sequence has 99.2% homology to the corresponding site to 16S rRNA of *Enterococcus avium*. The base sequence thereof is shown as SEQ ID NO: 1 in the Sequence Listing. Identification was performed by using BD BBLCRYSTAL GP ID test reagent (Becton, Dickinson and Company in Japan). The test results also showed that the strain is *Enterococcus avium*.

Then, the obtained strain (*Enterococcus avium* G 15) was deposited (NITE BP-142) on Sep. 22, 2005 at the Patent Microorganisms Depositary of the Incorporated Administrative Agency National Institute of Technology and Evaluation located at 2-5-8 Kazusakamatari, Kisarazu-shi, Chiba, 292-0818, JAPAN.

Example 2

Confirmation of GABA Productivity by *Enterococcus avium* G15 Strain

To MRS liquid medium (MRS broth, manufactured by Merk Co., Inc.), sodium glutamate was added so as to obtain a concentration of 0.5%. The medium was sterilized at 121° C. for 15 minutes and cooled to 30° C. G15 stain cells were previously cultured at the same medium for 48 hours. An amount of 2% was taken from the G15 fermentation solution and cultured at 30° C. for 48 hours. The degree of acidity of the culture solution due to lactic acid changed from 0.33 (time point: 0) to 1.22 (time point: 48 hour). The amount of GABA changed from 11.5 mg/100 ml (time point: 0) to 270 mg/100 ml (time point: 48 hour).

Example 3

Comparison of GABA Production in Fruit Juice Mediums

With respect to each of the fruit juices shown in Table 1, two mediums were prepared: one contained 0.5% of sodium glutamate and the other contained 0.5% of sodium glutamate+a 1% sake cake (SD) solution. These mediums were adjusted to pH of 5.8 and sterilized in an autoclave at 115° C. for 20 minutes. G15 stain cells, which were cultured in MRS medium for 24 hours in advance, were inoculated in each of the mediums in an amount of 2%. After culture was performed at 37° C. and 28° C. for 20 hours, the amount of GABA was quantified by an enzymatic method. The results are shown in Table 1.

Note that the 1% sake cake (SD) solution was prepared by dissolving spray dried sake cake (1 g) in 100 ml medium or purified water.

TABLE 1

| | Amount of GABA (mg/100 ml) | | | |
|---|---|---|---|---|
| | Culture at 37° C. | | Culture at 28° C. | |
| | Condition 1 | Condition 2 | Condition 1 | Condition 2 |
| White peach | 8.24 | 12.88 | 18.54 | 28.84 |
| White grape | 15.97 | 18.54 | 19.52 | 24.72 |
| Strawberry | 18.03 | 21.63 | 26.78 | 42.23 |
| Yellow peach | 9.27 | 11.85 | 3.61 | 24.21 |

Condition 1: 0.5% sodium glutamate
Condition 2: 0.5% sodium glutamate + 1% sake cake (SD) solution From Table 1, it was confirmed that the strain grows and proliferates in all of the mediums. The yield of GABA was higher in all fruit juice mediums containing sake cake.

Example 4

GABA Concentration Change with Time in Orange Fermentation Solution

Orange juice containing glutamic acid in a final concentration of 0.5% (w/v) and orange juice containing no glutamic acid were pasteurized (at 60° C., 30 minutes). Thereafter, G15 strain cells were inoculated to these and cultured at 37° C. The yield of GABA with the passage of time was checked. As a result, the yield of GABA increased only in the orange juice containing glutamic acid (Table 2).

TABLE 2

| | | GABA amount (mg/100 ml) | | | | |
|---|---|---|---|---|---|---|
| Time (hr) | | 0 | 8 | 16 | 24 | 32 |
| Orange | Glu (+) | 33.1 | 29.7 | 41.6 | 75.6 | 83.8 |
| | Glu (−) | 34.1 | 26.5 | 25.2 | 24.1 | 16.3 |

Glu: Glutamic acid

Example 5

Yield of GABA in Plant's Juice

To from-concentrate carrot juice, from-concentrate orange juice and from-concentrate pear juice, additives were added in accordance with the conditions shown in Table 3 to prepare mediums. Thereafter, the carrot medium was sterilized at 121° C. for 15 minutes, the orange medium at 105° C. for 5 minutes and the pear medium at 100° C. for 50 minutes. After the sterilization, the mediums were cooled to 30° C., and then, 2% amount of G15 strain starter (100% from-concentrate carrot juice+a 1.5% sake cake (SD) solution+0.5% glutamic acid) previously cultured was added to the mediums, which were cultured for a predetermined time. Thereafter, the content of GABA was measured (Table 3).

TABLE 3

| | | | | GABA amount (mg/100 ml) | | | |
|---|---|---|---|---|---|---|---|
| Plant's juice | Glu | Sodium citrate Na | Sake cake solution | 0 hr | 24 hr | 48 hr | 72 hr |
| Orange | 1% | 3% | — | 55 | — | 110 | — |
| | 1% | 3% | 1.5% | 56.1 | 795 | 787 | 791 |

TABLE 3-continued

GABA amount (mg/100 ml)

| Plant's juice | Glu | Sodium citrate Na | Sake cake solution | 0 hr | 24 hr | 48 hr | 72 hr |
|---|---|---|---|---|---|---|---|
| | 3% | 1% | 1.5% | 33.3 | 1137 | 1070 | 1096 |
| | 3% | 3% | 1.5% | 28.5 | 885 | 794 | 862 |
| | 3% | 1% | 1.5% | — | — | 2120 | — |
| Pear | 5% | 1% | 1.5% | — | — | 1320 | — |
| Carrot | 0.5% | — | 1.5% | 17.7 | 155 | 257 | 318 |
| | 2.5% | — | 1.5% | 20.0 | 182 | 276 | 413 |

Glu: Glutamic acid

As a result, in the case where 3% of glutamic acid, 1% of sodium citrate and a 1.5% sake cake (SD) solution were added to orange juice and cultured at 30° C. for 24 hours, the content of GABA reached 1,137 mg/100 ml.

Similarly, it was found that GABA can be produced also in carrot juice and pear juice by use of G15 strain.

Example 6

Production of Yogurt Containing GABA by Lactic Acid Bacteria Isolated from Plant 1) Preparation of G15 Stain Starter To carrot juice, a 1.5% sake cake (SD) solution, 0.5% of glutamic acid and 1% of sodium citrate are added and sterilized at 100° C. for 50 minutes and then cooled to 30° C. To the resultant juice, 2% of G15 strain is inoculated and cultured at 30° C. for 24 hours and then cooled to 10° C. or less. This is used as a starter.

2) Preparation of Lactic Acid Bacteria Isolated from Plant as a Starter

To a 13% aqueous solution of nonfat dry milk, 1% amount of sake cake (SD) solution is added and subjected to the same process as mentioned above to obtain a lactic acid bacteria isolated from plant as a starter.

3) Preparation of Orange Fermentation Solution

To a from-concentrate orange juice, a 1.5% sake cake (SD) solution, 0.5% glutamic acid and 1% sodium citrate are added, sterilized at 100° C. for 50 minutes and cooled to 30° C. To this, 2% of G15 strain starter prepared in the step 1) is inoculated, cultured at 30° C. for 48 hours and cooled to 10° C. or less. This is an orange fermentation solution containing GABA. GABA was contained in an amount of 1.5 g/100 ml in the orange fermentation solution.

4) Production of Yogurt

To a starting yogurt solution, 2% of the orange fermentation solution prepared in the step 3) was added and sterilized at 90° C. for 10 minutes. Thereafter, to this, the lactic acid bacteria isolated from plant (starter) prepared in the step 2) was inoculated in an amount of 5% and cultured at 38° C. for 10 hours and cooled to 10° C. or less. In this manner, yogurt containing GABA produced by lactic acid bacteria isolated from plant was obtained.

The invention claimed is:

1. A method of producing a fermented product containing γ-aminobutyric acid comprising fermenting at least one plant or juice thereof selected from the group consisting of oranges, peaches, grapes, strawberries, pears and carrots with *Enterococcus avium* G15 (NITE BP-142) in the presence of glutamic acid or a salt thereof and sake cake or an extract thereof.

2. The method according to claim 1, wherein the sake cake or the extract thereof is used within the range of 0.01 wt % to 5.0 wt % relative to the plant or juice thereof.

3. A fermented product produced by the method according to any one of claim 1 or 2.

4. Food or feed containing the fermented product produced by the method according to claim 1 or 2.

5. The method according to claim 1, wherein the plant or juice thereof is orange.

6. The method according to claim 1, wherein the plant or juice thereof is peach.

7. The method according to claim 1, wherein the plant or juice thereof is grape.

8. The method according to claim 1, wherein the plant or juice thereof is strawberry.

9. The method according to claim 1, wherein the plant or juice thereof is pear.

10. The method according to claim 1, wherein the plant or juice thereof is carrot.

* * * * *